(12) United States Patent
Boeck et al.

(10) Patent No.: US 10,195,703 B2
(45) Date of Patent: *Feb. 5, 2019

(54) MACHINE TOOL

(71) Applicant: Robert Bosch GmbH, Stuttgart (DE)

(72) Inventors: Cornelius Boeck, Kirchheim (DE); Daniel Barth, Leinfelden-Echterdingen (DE); Joachim Schadow, Stuttgart (DE); Sinisa Andrasic, Schoenaich (DE)

(73) Assignee: Robert Bosch GmbH, Stuttgart (DE)

( * ) Notice: Subject to any disclaimer, the term of this patent is extended or adjusted under 35 U.S.C. 154(b) by 678 days.

This patent is subject to a terminal disclaimer.

(21) Appl. No.: 14/367,340

(22) PCT Filed: Nov. 15, 2012

(86) PCT No.: PCT/EP2012/072747
§ 371 (c)(1),
(2) Date: Jun. 20, 2014

(87) PCT Pub. No.: WO2013/092028
PCT Pub. Date: Jun. 27, 2013

(65) Prior Publication Data
US 2014/0338947 A1 Nov. 20, 2014

(30) Foreign Application Priority Data
Dec. 23, 2011 (DE) .................. 10 2011 089 722

(51) Int. Cl.
B23Q 5/28 (2006.01)
B24B 23/02 (2006.01)
(Continued)

(52) U.S. Cl.
CPC ............ *B23Q 5/58* (2013.01); *B23Q 11/0078* (2013.01); *B24B 23/02* (2013.01); *B24B 23/028* (2013.01);
(Continued)

(58) Field of Classification Search
None
See application file for complete search history.

(56) References Cited

U.S. PATENT DOCUMENTS 1,929,662 A * 10/1933 Wappat .................... H01H 9/06
200/321
3,847,233 A * 11/1974 Glover .................... A01G 3/053
173/170
(Continued)

FOREIGN PATENT DOCUMENTS

CN 1476959 A 2/2004
CN 1596170 A 3/2005
(Continued)

OTHER PUBLICATIONS

International Search Report corresponding to PCT Application No. PCT/EP2012/072747, dated Mar. 22, 2013 (German and English language document) (5 pages).

*Primary Examiner* — Hemant M Desai
*Assistant Examiner* — Tanzim Imam
(74) *Attorney, Agent, or Firm* — Maginot, Moore & Beck LLP

(57) ABSTRACT

A machine tool, in particular an angle grinder, includes at least one switching unit that has at least one movably mounted ratchet element and at least one release element for unlocking a movement preventer of the ratchet element. The release element has at least one actuating region that is at least partially arranged laterally alongside an operating area of the ratchet element.

12 Claims, 9 Drawing Sheets

(51) Int. Cl.
*B25F 5/02* (2006.01)
*H01H 9/28* (2006.01)
*B23Q 5/58* (2006.01)
*H01H 3/20* (2006.01)
*H01H 9/06* (2006.01)
*B25F 5/00* (2006.01)
*B23Q 11/00* (2006.01)

(52) U.S. Cl.
CPC ............... *B25F 5/00* (2013.01); *B25F 5/02* (2013.01); *H01H 3/20* (2013.01); *H01H 9/06* (2013.01); *H01H 9/286* (2013.01); *H01H 2231/048* (2013.01); *H01H 2239/03* (2013.01)

(56) References Cited

U.S. PATENT DOCUMENTS

| | | | | |
|---|---|---|---|---|
| 3,953,696 A | * | 4/1976 | Reimann | H01H 13/62 200/318.1 |
| 3,971,492 A | * | 7/1976 | Lockwood | B05C 17/00523 173/170 |
| 4,122,320 A | * | 10/1978 | Edgell | H01H 9/06 200/43.17 |
| 5,577,600 A | * | 11/1996 | Schoene | H01H 3/20 200/321 |
| 5,638,945 A | * | 6/1997 | Fukinuki | H01H 3/20 200/318 |
| 6,274,828 B1 | * | 8/2001 | Chu | H01H 3/20 200/321 |
| 7,537,065 B2 | * | 5/2009 | Gallagher | B24B 23/02 173/170 |
| 2010/0116863 A1 | * | 5/2010 | Suda | B25C 1/008 227/8 |
| 2011/0005905 A1 | * | 1/2011 | Fukinuki | B25F 5/02 200/43.18 |
| 2014/0174772 A1 | * | 6/2014 | Mandalka | B25F 5/02 173/1 |
| 2015/0014013 A1 | * | 1/2015 | Boeck | B25F 5/02 173/170 |
| 2015/0034465 A1 | * | 2/2015 | Boeck | B24B 23/028 200/321 |

FOREIGN PATENT DOCUMENTS

| | | | |
|---|---|---|---|
| CN | 101454124 A | 6/2009 | |
| DE | 2460438 A1 | * 6/1976 | ........... B23B 45/001 |
| DE | 93 20 029 U1 | 7/1994 | |
| DE | 197 07 215 A1 | 9/1997 | |
| RU | 2 172 665 C1 | 8/2001 | |
| WO | 03/057395 A1 | 7/2003 | |

* cited by examiner

MACHINE TOOL

This application is a 35 U.S.C. § 371 National Stage Application of PCT/EP2012/072747, filed on Nov. 15, 2012, which claims the benefit of priority to Serial No. DE 10 2011 089 722.4, filed on Dec. 23, 2011 in Germany, the disclosures of which are incorporated herein by reference in their entirety.

BACKGROUND

Already known from DE 197 07 215 A1 is a power tool, in particular an angle grinder, which comprises a switching unit that has a movably mounted latch element and has a release element for unlocking a movement inhibitor of the latch element.

SUMMARY

The disclosure is based on a power tool, in particular an angle grinder, comprising at least one switching unit, which has at least one movably mounted latch element and has at least one a release element for unlocking a movement inhibitor of the latch element.

It is proposed that at least one actuating region of the release element be arranged, at least partially, laterally next to an operating surface of the latch element. The power tool is preferably realized as a portable power tool, in particular as a portable, hand-held power tool. A "portable power tool" is to be understood here to mean, in particular, a power tool, for performing work on workpieces, that can be transported by an operator without the use of a transport machine. The portable power tool has, in particular, a mass of less than 40 kg, preferably less than 10 kg, and particularly preferably less than 7 kg. Particularly preferably, the portable power tool is realized as an angle grinder. It is also conceivable, however, for the portable power tool to be of a different design, considered appropriate by persons skilled in the art, such as, for example, designed as a hammer drill and/or chipping hammer, power drill, saber saw, compass saw, hedge shears, etc.

The term "switching unit" is intended there to define, in particular, a unit having at least one component, in particular the latch element, which can be actuated directly by an operator, and which is provided to influence and/or alter a process and/or a state of a unit coupled to the switching unit, through an actuation and/or through an input of parameters. The latch element is preferably provided for actuating at least one switching element of the switching unit. A "latch element" is to be understood here to mean, in particular, an operating element that, along a direction of longitudinal extent of the operating element, has a longitudinal extent that is greater than a transverse extent of the operating element that runs at least substantially perpendicularly in relation to the direction of longitudinal extent and runs at least substantially transversely in relation to a main direction of movement of the operating element. In particular, a maximum longitudinal extent of the latch element is at least 2 times greater, preferably at least 4 times greater, and particularly preferably at least 6 times greater than a maximum transverse extent of the latch element. The latch element has, in particular, a maximum longitudinal extent that is greater than 3 cm, preferably greater than 6 cm, and particularly preferably greater than 8 cm.

In addition, the latch element preferably comprises an operating surface, in particular an operating surface constituted by a grip surface region of the latch element, on which an operator can place at least three fingers in order to actuate the latch element, and which has at least one longitudinal extent that is greater than 5 cm, running along the direction of longitudinal extent of the latch element. The expression "substantially perpendicularly" is intended here to define, in particular, an alignment of a direction relative to a reference direction, wherein the direction and the reference direction, in particular as viewed in one plane, enclose an angle of 90° and the angle has a maximum deviation of, in particular, less than 8°, advantageously less than 5°, and particularly advantageously less than 2°. "Substantially transversely" is to be understood here to mean, in particular, an alignment of a direction and/or of an axis relative to a reference direction and/or to a reference axis, wherein the alignment of the direction and/or of the axis are at least different from an at least substantially parallel alignment in relation to the reference direction and/or to the reference axis and, in particular, are askew or perpendicular in relation to the reference direction and/or to the reference axis. Preferably, the switching unit is provided to actuate the switching element by means of an actuation of the latch element, in order to open or close an electric circuit for supplying energy, at least to a drive unit of the power tool. The switching unit is thus preferably provided to enable the power tool to be put into operation or deactivated. "Provided" is to be understood to mean, in particular, specially designed and/or specially equipped. The switching element is preferably constituted by a mechanical, electrical and/or electronic switching element.

A "movement inhibitor" is to be understood here to mean, in particular, an inhibiting mechanism provided to prevent to a large extent a movement of a movably mounted component along at least one distance and/or about at least one axis, at least in an operating state, by means of a mechanical, electrical and/or electronic inhibitor. Preferably, the movement inhibitor is provided to prevent to a large extent a movement of the movably mounted latch element, at least in an operating state, by means of a mechanical inhibitor. It is also conceivable, however, for the movement inhibitor to prevent to a large extent a movement of the latch element, at least in an operating state, by means of an electromagnetic action of force and/or a permanent-magnet action of force, such as, for example, by means of displaceable magnets, upon the latch element. Preferably, the movement inhibitor can be unlocked by the release element of the switching unit, to enable the latch element to be moved as a result of an actuation of the latch element. The expression "actuating region" is intended here to define, in particular, a region of the release element that can be contacted directly by an operator in order to actuate, or move, the release element, when the release element has been mounted on the power tool. "Laterally next to" is to be understood here to mean, in particular, an arrangement of the actuating region of the release element relative to the latch element, wherein the actuating region, as viewed along a direction running at least substantially perpendicularly in relation to a side wall region of the latch element, in particular as viewed starting from the side wall region in a direction away from the latch element, is arranged at a distance relative to the latch element. Particularly preferably, the side wall region runs at least substantially perpendicularly in relation to a grip surface region of the latch element that constitutes a grip surface of the latch element. The release element is thus preferably arranged outside of the operating surface of the latch element. Particularly preferably, the release element is arranged outside of the latch element, on the power tool. Advantageously, the design of the power tool according to the disclosure, in particular arrangement of the release element laterally next to the latch element, makes it possible to realize ergonomic handling of the release element. An operator can comfortably hold or actuate the latch element with one hand, while actuating the release element with one finger of the hand. Moreover, advantageously, release of a movement inhibitor of the latch element as a result of an unintentional actuation of the latch element can be prevented, since the release element is arranged outside of the operating surface of the latch element.

Furthermore, it is proposed that the release element be mounted so as to be pivotable and/or rotatable about at least one release movement axis. It is also conceivable, however, for the release element to be mounted so as to be translationally movable along a release movement axis. Advantageously, the design according to the disclosure makes it possible to achieve a release element that is comfortable to operate.

Advantageously, the release element has at least one release movement axis, which runs in a plane extending at least substantially perpendicularly in relation to a movement axis of the latch element. Particularly preferably, the release movement axis is realized as a pivot axis. The release element thus preferably has a pivot axis that runs in a plane extending at least substantially perpendicularly in relation to a movement axis of the latch element. Through simple design means, it is possible to achieve an arrangement of the release element relative to the latch element that enables the release element to be operated comfortably, in particular enables the actuating region of the release element to be actuated comfortably, by means of a finger of one hand of an operator. Thus, advantageously, a high degree of operating comfort can be achieved.

In an alternative design of the power tool according to the disclosure, it is proposed that the release element have at least one release movement axis, which runs at least substantially parallelwise in relation to a movement axis of the latch element. Particularly preferably, the release movement axis is realized as a pivot axis. The release element thus preferably has a pivot axis that runs at least substantially parallelwise in relation to a movement axis of the latch element. Advantageously, it is possible to achieve a compact arrangement of the release element on the power tool.

In addition, it is proposed that the switching unit have at least one further release element. Preferably, the further release element has a further release movement axis, which runs at least substantially parallelwise in relation to the release movement axis of the release element. The further release movement axis in this case is realized as a pivot axis. In an alternative design of the power tool according to the disclosure, the further release element preferably has a further release movement axis that is identical to the release movement axis of the release element. Advantageously, by means of the design according to the disclosure, it is possible to achieve comfortable operation of the release element and/or of the further release element for right-handed and for left-handed operators.

Advantageously, the power tool according to the disclosure comprises a movement dependence unit, which motionally couples the release element and the further release element to each other, at least when in a mounted state. A "movement dependence unit" is to be understood here to mean, in particular, a unit provided to move at least one element in dependence on a movement of at least one further element, wherein the element is preferably moved along a direction whose orientation differs from, and, in particular, is opposite to, a movement direction of the further element, and/or along a direction that is the same as the movement direction of the further element. Particularly preferably, the movement dependence unit is constituted by a mechanical movement unit, which motionally couples the release element and the further release element to each other by means of a mechanical mechanism. It is also conceivable, however, for the movement dependence unit to be constituted by another unit, considered appropriate by persons skilled in the art, such as, for example, by a magnet movement unit, which motionally couples the release element and the further release element to each other by means of magnetic forces. Advantageously, by means of the design according to the disclosure, it is possible to achieve an at least substantially simultaneous movement of the release element and the further release element as the result of an actuation of the further release element or the further release element. Moreover, advantageously, it is possible to achieve comfortable unlocking of the movement inhibitor of the latch element by means of an actuation of the release element or the further release element, wherein, advantageously, only one of the release elements need be actuated in order to unlock the movement inhibitor.

Furthermore, it is proposed that the power tool according to the disclosure comprise at least one handle housing, wherein, as a result of an actuation of the release element or of the further release element in a direction toward the handle housing, the release element and the further release element are moved, by means of the movement dependence unit, in a direction toward the main handle housing. A "handle housing" is to be understood here to mean, in particular, at least one housing or at least one housing sub-region that, to a large extent, is dissociated from a mounting of a drive unit and/or output unit of the power tool, wherein at least one grip region of the housing or of the housing sub-region, in particular a housing sub-region realized as a stem-type grip region, can be gripped by an operator, by at least one hand, at least to a large extent, for the purpose of handling the power tool. The expression "can be gripped to a large extent" is intended here to define, in particular, a capability whereby a component or a component region can be gripped by a hand of an operator along at least more than 70%, preferably more than 80%, and particularly preferably more than 90% of a total extent of a total outer circumference of the component or of the component region that runs in a plane extending at least substantially perpendicularly in relation to a direction of longitudinal extent of the component or of the component region, wherein the total extent of the total circumference is, in particular, less than 40 cm, preferably less than 30 cm, and particularly preferably less than 25 cm. Preferably, when the component or component region is gripped, a hand inner surface and finger inner surfaces of the hand of the operator bear on the total outer circumference at least along a distance greater than 70%, preferably greater than 80%, and particularly preferably greater than 90% of the total extent of the total outer circumference. Preferably, the stem-type grip region, as viewed along a rotation axis of a drive element, in particular of an armature shaft, a drive unit of the power tool, and in particular along the direction of main extent of the power tool, is arranged behind the drive unit. Moreover, it is conceivable for the handle housing, in addition to having the stem-type grip region, to have a bow-shaped sub-region, which is integrally formed on to the stem-type grip region. The bow-shaped sub-region may preferably be of an L-shaped design, which extends in an L shape in the direction of the connecting region, starting from an end of the stem-type grip region that faces away from the connecting region of the handle housing. Preferably, the handle housing is realized so as to be separate from a drive housing of the power tool that is provided to accommodate the drive unit and/or output unit, in order to support drive bearing forces and/or output bearing forces. It is also conceivable, however, for the handle housing and the drive housing to be realized as a single piece.

Preferably, the handle housing has a stem-type grip region. The expression "stem-type grip region" is intended here to define, in particular, a housing sub-region of the handle housing that, as viewed in a longitudinal sectional plane, in which the direction of main extent of the power tool extends, along a direction running at least substantially perpendicularly in relation to the direction of main extent, has a maximum extent, in particular, of less than 10 cm, preferably of less than 8 cm, and particularly preferably of less than 6 cm, wherein at least one operating surface of the handle housing is arranged in the housing sub-region of the handle housing. Preferably, the maximum extent, as viewed in the longitudinal sectional plane, is delimited by at least two parallel straight lines, or by at least two straight lines, inclined relative to each other by an angle of less than 10°, preferably of less than 8°, and particularly preferably of less than 6°, that are constituted by an outer contour of the housing sub-region of the handle housing. The stem-type grip region is inclined relative to a direction of main extent of the power tool, in particular, at least by an angle of less than 60°, preferably of less than 40°, and particularly preferably of less than 30°. Particularly preferably, the handle housing comprises at least two handle housing shell elements, which can be joined to each other in a joint plane. The handle housing thus preferably has a shell-type structure. It is also conceivable, however, for the handle housing to have a pot-type structure. Particularly preferably, the release element and the further release element are each respectively arranged on one of the handle housing shell elements. Advantageously, by means of the design according to the disclosure, it is possible for the release element and the further release element to be pivoted into the handle housing as a result of an actuation of the release element or of the further release element.

Advantageously, the further release element is arranged in a mirror-symmetrical manner in relation to the release element. Thus, advantageously, it is possible to achieve a particularly ergonomic arrangement of the release element and of the further release element for right-handed and for left-handed operators.

Moreover, it is proposed that the further release element have at least one actuating region, which, in respect of a plane extending at least substantially perpendicularly in relation to a movement axis of the latch element, is arranged, at least partially, laterally next to the operating surface of the latch element, in a minor-symmetrical manner in relation to the actuating region. It is also conceivable, however, for the further release element to have a different arrangement relative to the release element, considered appropriate by persons skilled in the art, that makes it possible to achieve an ergonomic arrangement of the release element and of the further release element for right-handed and for left-handed operators. Advantageously, comfortable operation of the release element and/or of the further release element can be achieved by means of the arrangement, according to the disclosure, of the actuating region of the further release element.

Particularly preferably, the release element and the further release element are mounted so as to be movable relative to each other. Particularly advantageously, this enables the release element and the further release element to be moved in mutually different directions as a result of an actuation of the release element and of the further release element.

Moreover, it is proposed that the power tool comprise at least the movement dependence unit, which is provided to move the release element and the further release element in opposite directions as a result of an actuation of the release element or of the further release element. Advantageously, if the further release element is arranged on a side of the handle housing that faces away from the further release element, the release element and the further release element can be moved into the handle housing as a result of an actuation of the release element and of the further release element.

Advantageously, the movement dependence unit is realized as a link unit. A "link unit" is to be understood here to mean, in particular, a unit that connects at least two components to each other so as to be movable relative to each other, in particular so as to be pivotable and/or rotatable relative to each other, wherein a movement of one of the components causes a movement of the other component, via a link point of the unit. The link point in this case may be realized, for example, as a toothing, or may be of another design, considered appropriate by persons skilled in the art. Thus, through simple design means, movement dependence between the release element and the further release element can be achieved, in particular if the release element and the further release element are pivotally mounted.

Preferably, the movement dependence unit is realized as a link unit, which has at least one link element, which is integral with the release element or with the further release element. "Integral with" is to be understood to mean, in particular, connected at least in a materially bonded manner, for example by a welding process, an adhesive process, an injection process and/or another process considered appropriate by persons skilled in the art, and/or, advantageously, formed in one piece such as, for example, by being produced from a casting and/or by being produced in a single or multi-component injection process and, advantageously, from a single blank. Advantageously, a compact arrangement of the link element on the release element or on the further release element can be achieved. Moreover, advantageously, savings can be achieved in structural space, components and costs.

It is additionally proposed that the switching unit have at least one spring element, which is provided to apply a spring force to, at least, the release element, in the direction of a locking position of the release element. A "spring element" is to be understood to mean, in particular, a macroscopic element having at least one extent that, in a normal operating state, can be varied elastically by at least 10%, in particular by at least 20%, preferably by at least 30%, and particularly advantageously by at least 50% and that, in particular, generates a counter-force, which is dependent on a variation of the extent and preferably proportional to the variation and which counteracts the variation. An "extent" of an element is to be understood to mean, in particular, a maximum distance of two points of a perpendicular projection of the element on to a plane. A "macroscopic element" is to be understood to mean, in particular, an element having an extent of at least 1 mm, in particular of at least 5 mm, and preferably of at least 10 mm. Preferably, the spring element is constituted by a compression spring. It is also conceivable, however, for the spring element to be of another design, considered appropriate by persons skilled in the art, such as, for example, designed as a tension spring, etc. The spring element makes it possible, advantageously, to achieve automatic movement of the release element into the locking position, in particular after the operator has removed an action of force upon the latch element, and the latch element is in an initial position of the latch element.

Advantageously, the switching unit has at least one spring element, which is supported, by one end, on the release element and, by a further end, is supported on a further release element of the switching unit. It is also conceivable, however, for the switching unit to have at least two spring elements, wherein one spring element is assigned to the release element and one spring element is assigned to the further release element. By means of the design according to the disclosure, a restoring function of the release element and further release element can be realized through simple design means.

Furthermore, it is proposed that the release element have at least one unlocking receiving recess, which is provided to receive an inhibitor element of the switching unit, when the release element is in an unlocking position, as a result of an actuation of the latch element. Preferably, when the release element is in the unlocking position, the inhibitor element engages in the unlocking receiving recess, as a result of an actuation of the latch element, to enable the latch element to be moved. Preferably, when the release element is in an inhibiting position, for the purpose of inhibiting a movement of the latch element, as a result of an actuation of the latch element, the inhibitor element strikes against an inhibitor surface of the release element. The design according to the disclosure enables unlocking of the movement inhibitor to be achieved through simple design means. Moreover, inhibiting of a movement of the latch element when in the inhibiting position can be achieved through simple design means, in that, when the release element is in the inhibiting position, the inhibitor is prevented from being received in the unlocking receiving recess.

It is additionally proposed that the power tool according to the disclosure comprise at least the handle housing, wherein the actuating region of the release element, after an actuation, is at least substantially flush with an outer surface of the handle housing. "At least substantially flush with" is to be understood here to mean, in particular, an arrangement of the actuating region after an actuation of the release element, in particular after the release element has been pivoted into the handle housing, wherein the actuating region, as viewed starting from a space enclosed by the handle housing, in the direction of the outer surface of the handle housing, along a direction running substantially perpendicularly in relation to the outer surface of the handle housing, extends maximally 2 mm over the outer surface, and particularly preferably extends maximally as far as the outer surface of the handle housing. The actuating region of the release element, after an actuation, thus does not extend beyond the outer surface of the handle housing. Advantageously, as a result of the release element being inserted fully into the handle housing, it is possible to achieve a compact arrangement of the release element when in an actuated state. Moreover, advantageously, an operator can be provided with a visual indication that the release element is in an unlocking position.

Particularly preferably, the power tool according to the disclosure comprises at least the handle housing, wherein the actuating region of the release element and an actuating region of a further release element of the switching unit, after an actuation, are at least substantially flush with an outer surface of the handle housing. Thus, advantageously, when the release element and/or the further release element are/is in an actuated state, the actuating region of the release element and the actuating region of the further release element can be inserted fully.

Furthermore, it is proposed that the latch element be mounted so as to be pivotable, in particular pivotable relative to the handle housing, about a movement axis, realized as a pivot axis, of the latch element. It is also conceivable, however, for the latch element to be mounted so as to be translationally movable along a movement axis of the latch element that is realized as a translation axis. Particularly preferably, the pivot axis runs at least substantially perpendicularly in relation to the joint plane of the handle housing. Advantageously, an easily operated latch element can be created, with which a mounting is not susceptible to dirt accumulation. Moreover, advantageously, a lever action can be used for comfortable actuation of the switching unit by means of the latch element.

The disclosure is additionally based on a power switching device of a power tool according to the disclosure, wherein the power tool switching device comprises at least the switching unit. In addition, it is conceivable for the power tool switching device to have at least one bearing unit, for mounting the latch element in a movable manner. The bearing unit in this case may be realized as a translational bearing unit, as a rotational bearing unit, or of a combination of a translational bearing unit and a rotational bearing unit, such as, for example, a lever mechanism bearing unit, etc. Thus, advantageously, already existing power tools can easily be retrofitted with the switching unit according to the disclosure.

The power tool according to the disclosure and/or the power tool switching device according to the disclosure are/is not intended in this case to be limited to the application and embodiment described above. In particular, the power tool according to the disclosure and/or the power tool switching device according to the disclosure may have individual elements, components and units that differ in number from a number stated herein, in order to fulfill a principle of function described herein.

BRIEF DESCRIPTION OF THE DRAWINGS

Further advantages are given by the following description of the drawings. The drawings show exemplary embodiments of the disclosure. The drawings, the description and the claims contain numerous features in combination. Persons skilled in the art will also expediently consider the features individually and combine them to create appropriate further combinations.

In the drawing.

DETAILED DESCRIPTION

Figure 1:
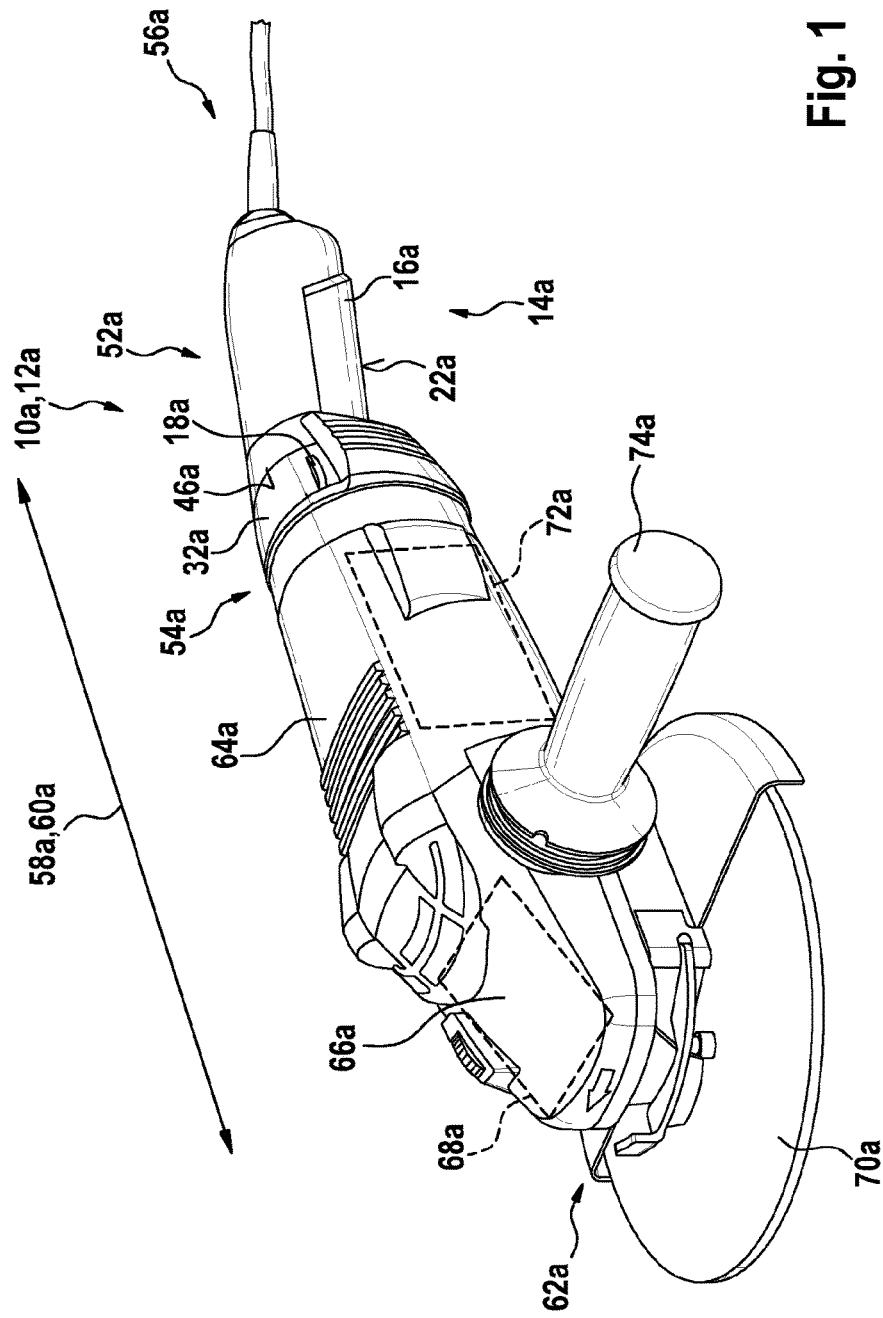
FIG. 1 shows a power tool according to the disclosure, in a schematic representation.

FIG. 1 shows a power tool 10a, which is constituted by a portable power tool 10a realized as an angle grinder 12a. The portable power tool 10a comprises at least one switching unit 14a, which has at least one movably mounted latch element 16a for actuating a switching element 50a of the switching unit 14a (FIG. 3), and at least one release element 18a for unlocking a movement inhibitor of the latch element 16a. The portable power tool 10a in this case comprises at least one power tool switching device, which comprises at least the switching unit 14a and at least one bearing unit 90a for mounting the latch element 16a of the switching unit 14a in a movable manner. The release element 18a comprises at least one actuating region 20a, which is arranged, at least partially, laterally next to an operating surface 22a of the latch element 16a. The release element 18a in this case is arranged on a handle housing 32a of the portable power tool 10a. The handle housing 32a comprises a stem-type grip region 52a, on which the latch element 16a is arranged. The stem-type grip region 52a of the handle housing 32a constitutes a main handle of the portable power tool 10a. In this case, the main handle constituted by the stem-type grip region 52a extends, at least substantially, starting from a connecting region 54a of the handle housing 32a, in a direction away from the connecting region 54a, as far as a side 56a of the main handle housing 32a on which there is arranged a cable of the portable power tool 10a, realized as an angle grinder 12a, for supplying energy. The stem-type grip region 52a of the handle housing 32a is offset relative to a direction of main extent 58a of the handle housing 32a, or relative to a direction of main extent 60a of the portable power tool 10a, by an angle of less than 30°.

The portable power tool 10a, realized as an angle grinder 12a, additionally comprises a protective cover unit 62a, a drive housing 64a and an output housing 66a. Extending out from the output housing 66a there is an output shaft of an output unit 68a of the portable power tool 10a, which is realized as a spindle (not represented in greater detail here), to which a working tool 70a can be fixed, for performing work on a workpiece (not represented in greater detail here). The working tool 70a is realized as an abrasive disk. It is also conceivable, however, for the working tool 70a to be realized as a parting disk or polishing disk. The portable power tool 10a comprises the drive housing 64a, for accommodating a drive unit 72a of the portable power tool 10a, and the output housing 66a, for accommodating the output unit 68a. The drive unit 72 is provided to drive the working tool 70a in rotation, via the output unit 68a. For the purpose of performing work on a workpiece, the working tool 70a in this case may be connected to the spindle in a rotationally fixed manner by means of a fastening element (not represented in greater detail here). The working tool 70a can thus be driven in rotation when the portable power tool 10a is in operation. The output unit 68a is connected to the drive unit 72a via a drive element (not represented in greater detail here) of the drive unit 72a that is realized as a pinion gear and that can be driven in rotation, in a manner already known to persons skilled in the art. In addition, an ancillary handle 74a is arranged on the output housing 66a. When mounted on the output housing 66a, the ancillary handle 74a extends transversely in relation to the direction of main extent 60a of the portable power tool 10a.

Figure 2:
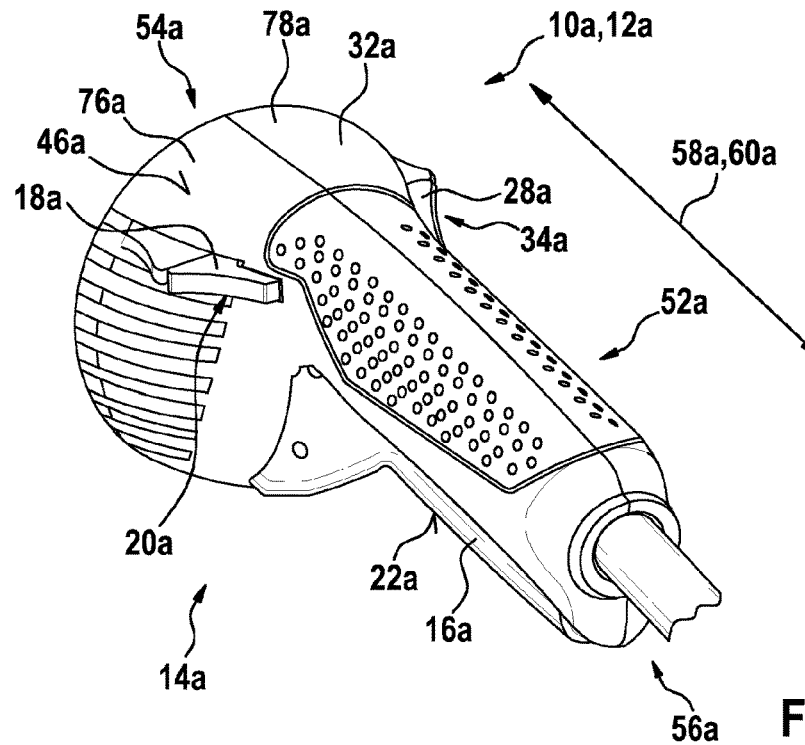
FIG. 2 shows a detail view of a release element, arranged on a handle housing of the power tool according to the disclosure, of a switching unit of the power tool according to the disclosure, in an unactuated state, in a schematic representation.

FIG. 2 shows a detail view of the release element 18a of the switching unit 14a arranged on the handle housing 32a, when the release element 18a is in an unactuated state. The release element 18a is arranged on the handle housing 32a, in a region of an end of the handle housing 32a that faces toward the connecting region 54a. In addition, the release element 18a is arranged, at least partially, outside of the stem-type grip region 52a. In this case, at least the actuating region 20a of the release element 18a is arranged mainly outside of the stem-type grip region 52a. The release element 18a is mounted so as to be pivotable about at least one release movement axis 24a. The release movement axis 24a is thus realized as a release pivot axis. The release element 18a has, at least, the release movement axis 24a, which runs in a plane extending at least substantially perpendicularly in relation to a movement axis 26a of the latch element 16a. The latch element 16a in this case is mounted so as to be pivotable about the movement axis 26a, realized as a pivot axis 48a, of the latch element 16a. The movement axis 26a realized as a pivot axis 48*a* runs at least substantially perpendicularly in relation to a joint plane of the handle housing 32*a*, in which two handle housing shell elements 76*a*, 78*a* of the handle housing 32*a* are joined to each other. The release movement axis 24*a* thus runs at least substantially parallelwise in relation to the joint plane of the handle housing 32*a*. Moreover, the release movement axis 24*a* runs at least substantially transversely in relation to the movement axis 26*a*, realized as a pivot axis 48*a*, of the latch element 16*a*.

Figure 3:
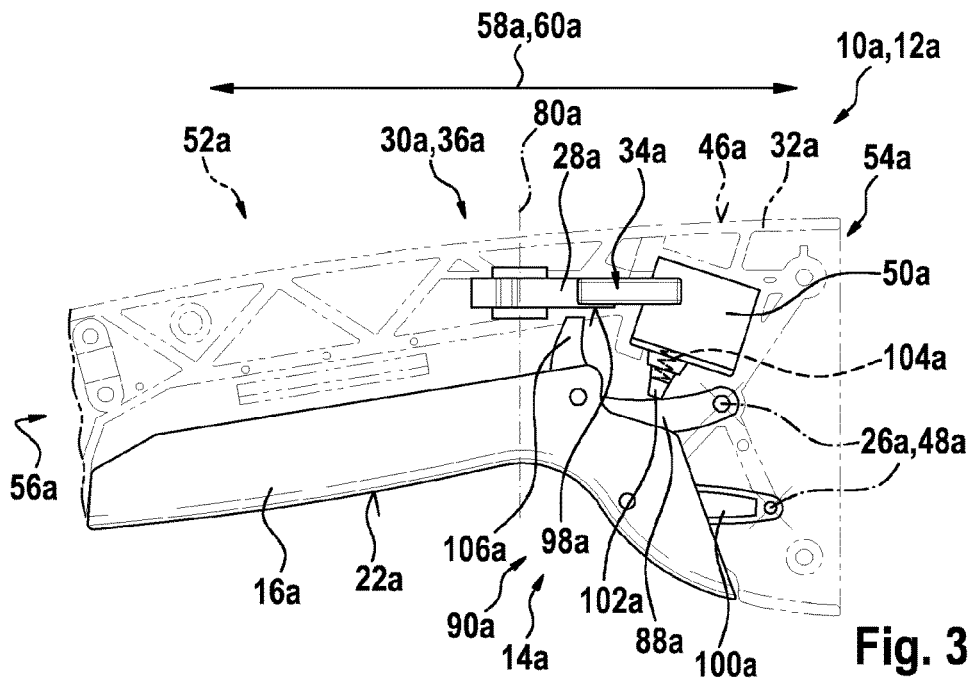
FIG. 3 shows a further detail view of the release element arranged on the handle housing, in an unactuated state, in a schematic representation.

Furthermore, the switching unit 14*a* has at least one further release element 28*a*. The further release element 28*a* is likewise arranged on the handle housing 32*a*, in the region of the end of the handle housing 32*a* that faces toward the connecting region 54*a* (FIGS. 2 and 3). Moreover, the further release element 28*a* is likewise arranged, at least partially, outside of the stem-type grip region 52*a*. In this case, at least one actuating region 34*a* of the further release element 28*a* is arranged mainly outside of the stem-type grip region 52*a*. The further release element 28*a* is arranged in a mirror-symmetrical manner in relation to the release element 18*a*. The further release element 28*a* thus has, at least, the actuating region 34*a*, which, in respect of a plane extending at least substantially perpendicularly in relation to the movement axis 26*a* of the latch element 16*a*, is arranged, at least partially, laterally next to the operating surface 22*a* of the latch element 16*a*, in a mirror-symmetrical manner in relation to the actuating region 20*a* of the release element 18*a*. The further release element 28*a* is mounted so as to be pivotable about at least one further release movement axis 80*a*. The further release movement axis 80*a* is realized as a release pivot axis. The further release movement axis 80*a* in this case runs in a plane extending at least substantially perpendicularly in relation to the movement axis 26*a*, realized as a pivot axis 48*a*, of the latch element 16*a*. The further release movement axis 80*a* thus runs at least substantially parallelwise in relation to the joint plane of the main handle housing 32*a*. Moreover, the further release movement axis 80*a* runs at least substantially transversely in relation to the movement axis 26*a*, realized as a pivot axis 48*a*, of the latch element 16*a*. The further release movement axis 80*a* runs at least substantially parallelwise in relation to the release movement axis 24*a* of the release element 18*a*. The release element 18*a* and the further release element 28*a* are mounted so as to be movable relative to each other.

Figure 4:
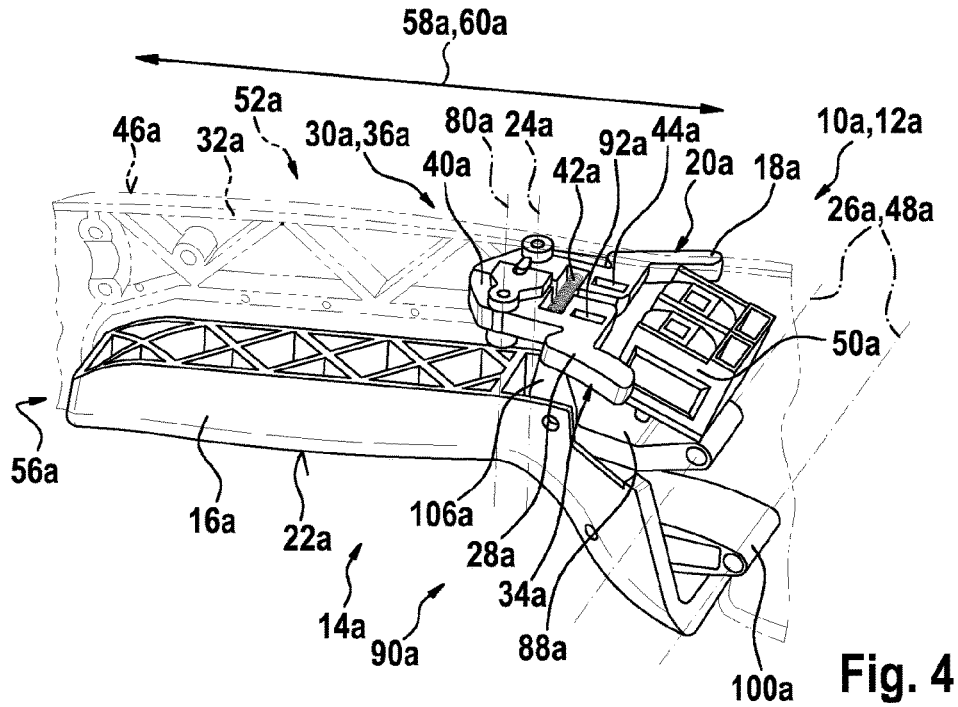
FIG. 4 shows a further detail view of the release element, arranged on the handle housing, in an unactuated state, in a schematic representation.
Figure 8:
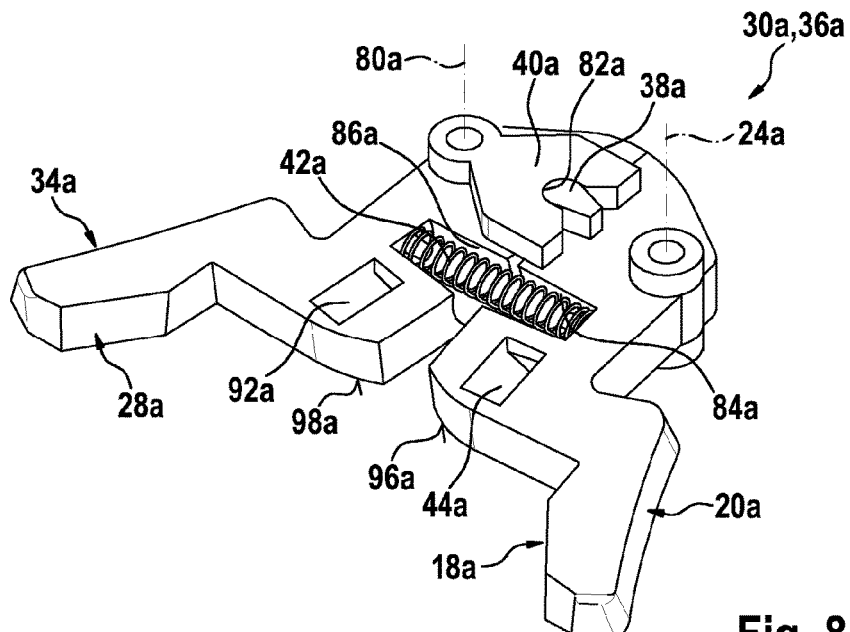
FIG. 8 shows a detail view of a movement dependence unit of the power tool according to the disclosure, in a schematic representation.

In addition, the portable power tool 10*a* has at least one movement dependence unit 30*a*, which motionally couples the release element 18*a* and the further release element 28*a* to each other, at least when in a mounted state (FIG. 4). The movement dependence unit 30*a* is provided to move the release element 18*a* and the further release element 28*a* in opposite directions as a result of an actuation of the release element 18*a* or of the further release element 28*a*. The release element 18*a* and the further release element 28*a* are thus always moved jointly, by means of the movement dependence unit 30*a*, as a result of an actuation of the release element 18*a* or of the further release element 28*a*. In this case, as a result of an actuation of the release element 18*a* or of the further release element 28*a* in a direction toward the handle housing 32*a*, the release element 18*a* and the further release element 28*a* are moved, by means of the movement dependence unit 30*a*, in a direction toward the handle housing 32*a*. The movement dependence unit 30*a* is realized as a link unit 36*a*. The movement dependence unit 30*a*, realized as a link unit 36*a*, has at least one link element 38*a*, which is realized so as to be integral with the release element 18*a* or with the further release element 28*a*. The link element 38*a* in this case is integral with the release element 18*a* (FIGS. 4 and 8). In addition, the movement dependence unit 30*a*, realized as a link unit 36*a*, has a further link element 40*a*, which is realized so as to be integral with the further release element 28*a*. The link element 38*a* and the further link element 40*a* are provided to move the release element 18*a* and the further release element 28*a* in dependence on each other, by means of a combined action. The further link element 40*a* comprises an engagement recess 82*a*, which is substantially of U-shaped design. The link unit 38*a* in this case, when in a mounted state, engages in the engagement recess 82*a*. The link element 38*a* in this case is of a drop-shaped design, whose sub-region in the form of a circular disk is arranged in the engagement recess 82*a* when the release element 18*a* and the further release element 28*a* are in a mounted state.

As a result of an actuation of the release element 18*a* or of the further release element 28*a*, forces are transmitted between the release element 18*a* and the further release element 28*a*, via flank regions of the link element 38*a* and of the further link element 40*a*, by means of a combined action of the link element 38*a* and the further link element 40*a*, which forces cause the release element 18*a* and the further release element 28*a* to move in dependence on each other. The flank regions of the further link element 40*a* in this case are constituted by angled limb regions of the engagement recess 82*a*. The flank regions of the link element 38*a* are constituted by side walls of the link element 38*a*. It is likewise conceivable for the movement dependence unit 30*a* to be designed as a toothed movement dependence unit, wherein forces for dependently moving the release element 18*a* and the further release element 28*a* can be transmitted via tooth flanks of a toothing of the toothed movement dependence unit. In this case, one toothing element, respectively, is realized so as to be integral with the release element 18*a* and with the further release element 28*a*.

Furthermore, the switching unit 14*a* has at least one spring element 42*a*, which is provided to apply a spring force to, at least, the release element 18*a*, in the direction of a locking position of the release element 18*a* (FIG. 8). The spring element 42*a* is realized as a compression spring. The spring element 42*a* in this case is supported, by one end, on the release element 18*a* and, by a further end, the spring element 42*a* is supported on the further release element 28*a* of the switching unit 14*a*. The release element 18*a* and the further release element 28*a* each comprise a spring receiving recess 84*a*, 86*a*, in which the spring element 42*a* is arranged when in a mounted state. The spring receiving recesses 84*a*, 86*a* are realized as semi-cylindrical receiving cavities. It is also conceivable, however, for the spring receiving recesses 84*a*, 86*a* to be of a different design, considered appropriate by persons skilled in the art.

Figure 6:
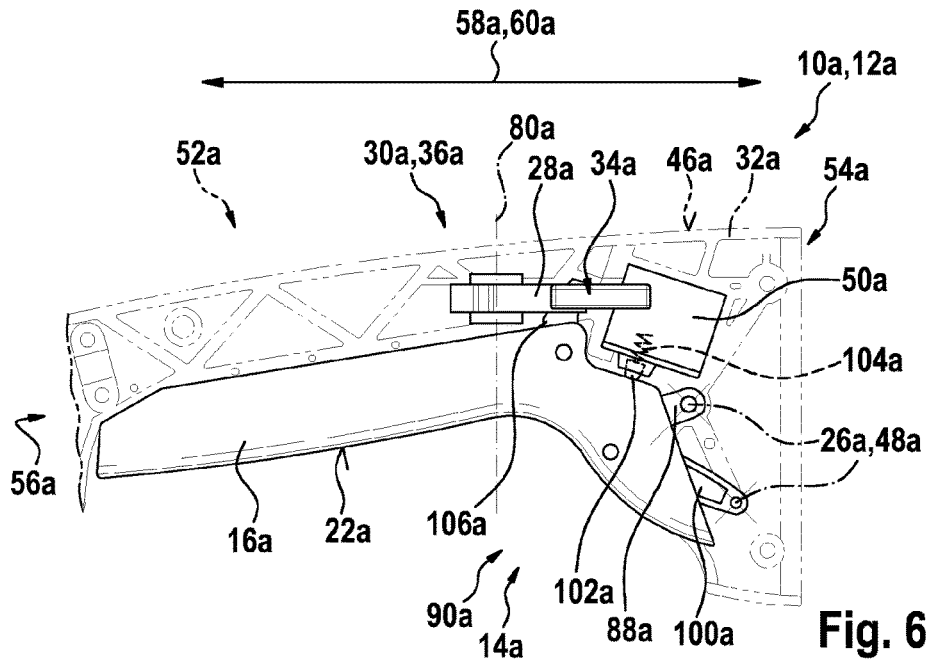
FIG. 6 shows a further detail view of the release element, arranged on the handle housing, in an actuated state, in a schematic representation.

In addition, the release element 18*a* has at least one unlocking receiving recess 44*a*, which is provided to receive an inhibitor element 94*a* of the switching unit 14*a*, when the release element 18*a* is in an unlocking position, as a result of an actuation of the latch element 16*a* (FIG. 6). The inhibitor element 94*a* is arranged on a lever bearing element 88*a* of the bearing unit 90*a* of the portable power tool 10*a*. The inhibitor element 94*a* in this case is realized so as to be integral with the lever bearing element 88*a*. The further release element 28*a* likewise comprises at least one unlocking receiving recess 92*a*, which is provided to receive a further inhibitor element 106*a* of the switching unit 14*a*, when the further release element 28*a* is in an unlocking position, as a result of an actuation of the latch element 16*a*

Figure 7:
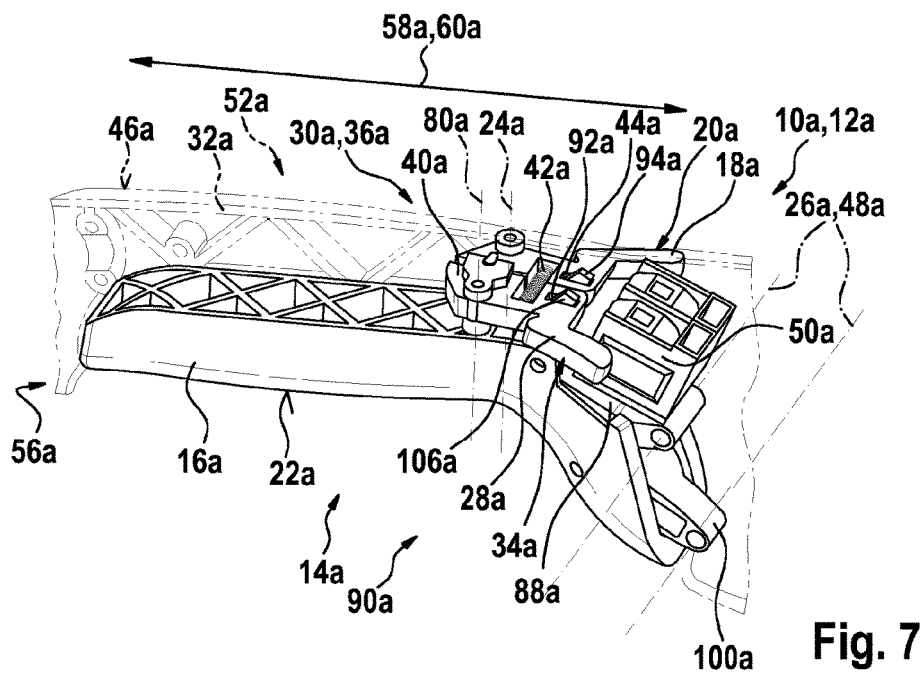
FIG. 7 shows a further detail view of the release element, arranged on the handle housing, in an actuated state, in a schematic representation.

(FIG. 7). The further inhibitor element 106a is likewise arranged on the lever bearing element 88a. In this case, the further inhibitor element 106a is likewise realized so as to be integral with the lever bearing element 88a. When the release element 18a is in a locking position, in which a movement of the latch element 16a is very largely prevented by means of the movement inhibitor, the inhibitor element 94a strikes against an inhibitor surface 96a of the release element 18a, as a result of an actuation of the latch element 16a. The inhibitor surface 96a is arranged on a side of the release element 18a that faces toward the latch element 16a. In this case, the inhibitor surface 96a is arranged laterally next to the unlocking receiving recess 44a of the release element 18a (FIG. 8). Moreover, when the further release element 28a is in a locking position, in which a movement of the latch element 16a is prevented to a large extent by means of the movement inhibitor, the further inhibitor element 106a strikes against a further inhibitor surface 98a of the further release element 28a, as a result of an actuation of the latch element 16a. The further inhibitor surface 98a is arranged on a side of the further release element 28a that faces toward the latch element 16a. In this case, the further inhibitor surface 98a is arranged laterally next to the unlocking receiving recess 92a of the further release element 28a (FIG. 8).

Figure 5:
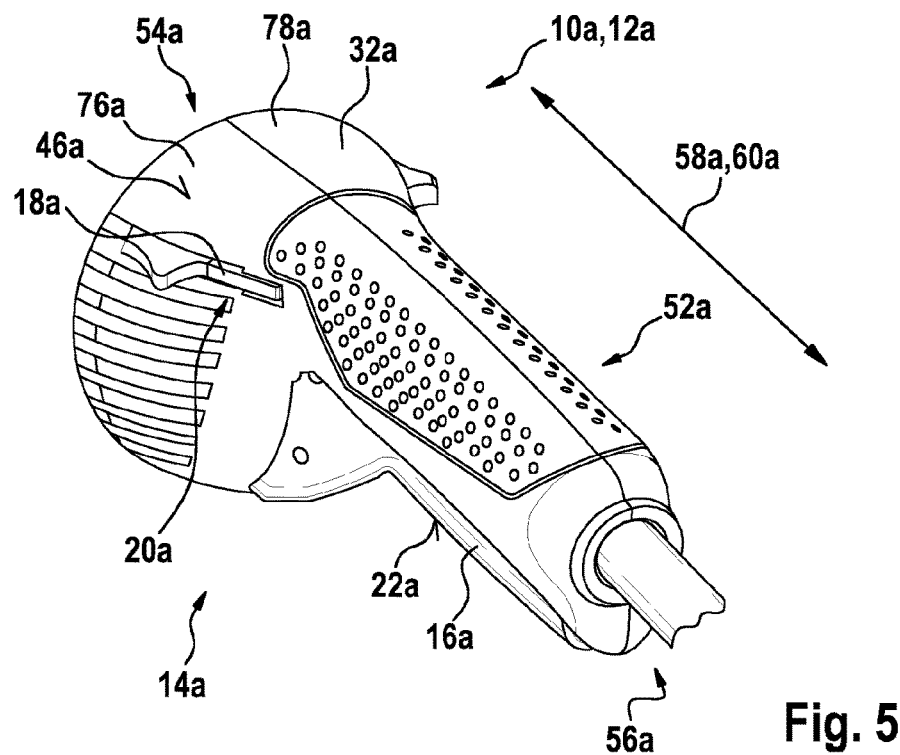
FIG. 5 shows a detail view of the release element, arranged on the handle housing, in an actuated state, in a schematic representation.
Figure 9:
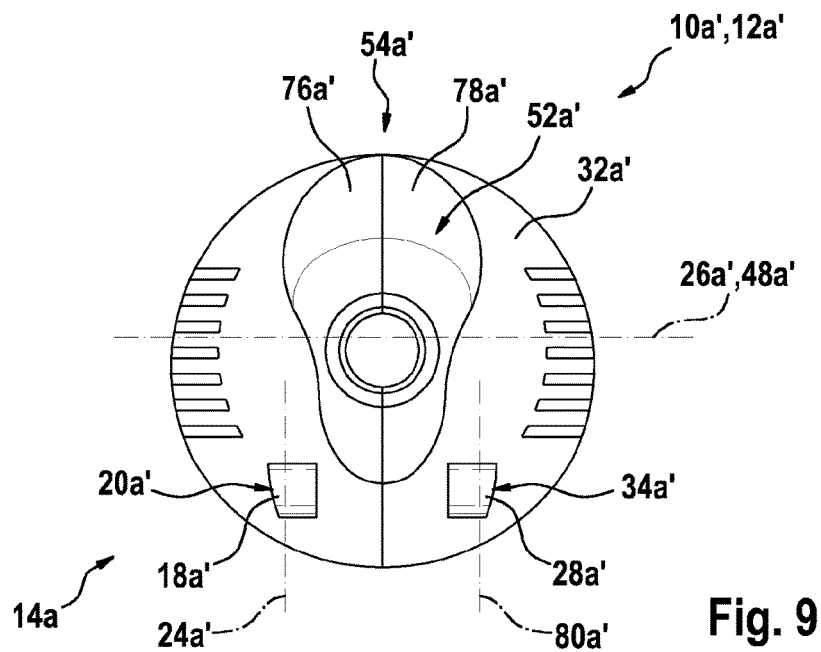
FIG. 9 shows a detail view of an alternative arrangement of a release element on a handle housing of an alternative power tool according to the disclosure, in a schematic representation.

When the release element 18a and the further release element 28a are in an unactuated state, the actuating region 20a of the release element 18a and the actuating region 34a of the further release element 28a, as viewed along a direction running at least substantially perpendicularly in relation to an outer surface 46a of the handle housing 32a, extend out by more than 2 mm beyond the outer surface 46a. The actuating region 20a of the release element 18a, after an actuation, is at least substantially flush with the outer surface 46a of the handle housing 32a (FIG. 5). The actuating region 34a of the further release element 28a of the switching unit 14a, after an actuation, is likewise at least substantially flush with the outer surface 46a of the handle housing 32a. The release element 18a and the further release element 28a, as viewed along a direction of main extent of the latch element 16a, are arranged on a region of the handle housing 32a that faces away from the latch element 16a. Consequently, an operator can use an index finger or a thumb of one hand to actuate the actuating region 20a of the release element 18a or the actuating region 34a of the further release element 28a. The release element 18a and the further release element 28a, as viewed along the direction of main extent of the latch element 16a, in the direction of the handle housing 32a, are thus arranged above the latch element 16a, or after the latch element 16a. In an alternative arrangement of the release element 18a' and of the further release element 28a', represented in FIG. 9, the release element 18a' and the further release element 28a', as viewed along the main direction of movement of the latch element 16a', starting from the latch element 16a', in a direction away from the handle housing 32a', are arranged beneath the latch element 16a', or after the latch element 16a'.

Furthermore, the portable power tool 10a has at least the bearing unit 90a, which is provided to mount the latch element 16a so as to be, at least, movable relative to the handle housing 32a. The bearing unit 90a is provided to ensure a travel movement of the latch element 16a along a distance having a value of greater than zero in every case, as a result of an actuation of the latch element 16a, starting from an end of the latch element 16a that faces toward the connecting region 54a of the handle housing 32a, in the direction of a further end of the latch element 16a that can be gripped and that faces away from the connecting region 54a. The bearing unit 90a has, at least, the lever bearing element 88a, which is provided to actuate a switching tappet element 102a of the switching element 50a of the switching unit 14a in dependence on a movement of the latch element 16a (FIGS. 3, 4 and 5). The lever bearing element 88a is movably connected to the latch element 16a at the end of the latch element 16a that faces toward the connecting region 54a of the handle housing 32a. In addition, the bearing unit 90a has at least one further lever bearing element 100a, which is arranged in a movable manner on the latch element 16a and in a movable manner on one of the handle housing shell elements 76a, 78a of the handle housing 32a. The lever bearing element 88a and the further lever bearing element 100a are aligned so as to be at least substantially parallel to each other. Owing to the at least substantially parallel arrangement of the lever bearing element 88a and the further lever bearing element 100a, an actuation of the latch element 16a results in a parallel guidance of the latch element 16a. The further end of the latch element 16a that can be gripped and that faces away from the connecting region 54a is in this case dissociated from an arrangement of bearing points of the bearing unit 90a.

Furthermore, the switching unit 14a has at least one further spring element 104a, which is provided to apply a spring force of the further spring element 104a to the latch element 16a, in the direction of an initial position of the latch element 16a. The further spring element 104a is provided to constitute a dead man's circuit function of the switching unit 14a. The further spring element 104a is provided to enable the latch element 16a to move into an initial position of the latch element 16a, as a result of an action of a spring force upon the latch element 16a, after removal of an action of an actuating force of an operator upon the latch element 16a, in a direction away from the handle housing 32a. The further spring element 104a in this case is constituted by a spring element of the switching element 50a that applies a spring force to the switching tappet element 102a of the switching element 50a. The further spring element 104a thus exerts a spring force upon the latch element 16a via the lever bearing element 88a, which actuates the switching tappet element 102a of the switching element 50a as a result of a movement of the latch element 16a, in the direction of the handle housing 32a. As a result of this, the latch element 16a, after removal of an action of an actuating force of an operator, is moved in the direction away from the handle housing 32a. An alignment of the operating surface 22a of the latch element 16a relative to the handle housing 32a is maintained, at least substantially, by means of the bearing unit 90a, as a result of a movement of the latch element 16a relative to the handle housing 32a. By means of the bearing unit 90a, therefore, an even travel movement is achieved over then entire operating surface 22a of the latch element 16a, in the direction of the handle housing 32a, as a result of an actuation of the latch element 16a.

To put the portable power tool 10a into operation, an operator actuates the release element 18a or the further release element 28a, starting from the locking position of the release element 18a and of the further release element 28a, in order to unlock the movement inhibitor of the latch element 16a (FIGS. 2 to 4). As a result of the actuation of the release element 18a or of the further release element 28a, the release element 18a and the further release element 28a, by means of the movement dependence unit 30a, pivot about the release movement axis 24a and the further release movement axis 80a, respectively, into the handle housing 32a, until the actuating region 20a of the release element 18a and the actuating region 34a of the further release element 28a are at least substantially flush with the outer surface 46a of the handle housing 32a (FIG. 5). The release element 18a and the further release element 28a are thus in the unlocking position (FIGS. 6 and 7). The release element 18a and the further release element 28a are held by the operator in the unlocking position until the inhibitor element 94a and the further inhibitor element 106a have gone into the unlocking receiving recesses 44a, 92a of the release element 18a and of the further release element 28a as a result of a movement of the latch element 16a in the direction of the handle housing 32a (FIGS. 6 and 7). The operator then only has to apply a force that holds the latch element 16a in a switch-on position. By means of a movement of the latch element 16a in the direction of the handle housing 32a, when the release element 18a and the further release element 28a are in the unlocking position, the switching tappet element 102a of the switching element 50a is additionally actuated by means of the lever bearing element 88a (FIG. 6).

By means of the engagement of the inhibitor element 94a and the further inhibitor element 106a in the unlocking receiving recesses 44a, 92a, the release element 18a and the further release element 28a are held in the unlocking position until an action of force of an operator upon the latch element 16a is removed, and the latch element 16a is moved into an initial position as a result of a spring force of the further spring element 104a. As a result of this, the inhibitor element 94a and the further inhibitor element 106a are moved out of the unlocking receiving recesses 44a, 92a. The release element 18a and the further release element 28a are moved into the locking position by means of a spring force of the spring element 42a. Thus, after an action of force of the operator upon the latch element 16a has been removed, the movement inhibitor of the latch element 16a is active, after the latch element 16a has been moved into an initial position and after the release element 18a and the further release element 28a have been moved into a locking position.

Alternative exemplary embodiments are represented in FIGS. 10 to 16. Components, features and functions that remain substantially the same are denoted, in principle, by the same references. To differentiate the exemplary embodiments, the letters a and h have been appended to the references of the exemplary embodiments. The description that follows is limited substantially to the differences in relation to the first exemplary embodiment in FIGS. 1 to 9, and reference may be made to the description of the first exemplary embodiment in FIGS. 1 to 9 in respect of components, features and functions that remain the same.

Figure 10:
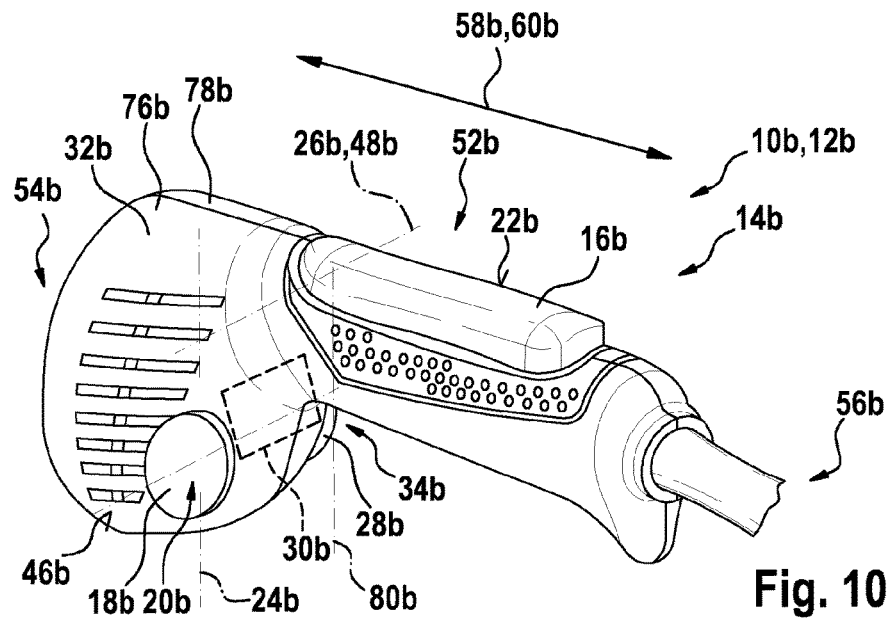
FIG. 10 shows a detail view of a release element, arranged on a handle housing of a further, alternative power tool according to the disclosure, of a switching unit of the further, alternative power tool according to the disclosure, and an arrangement, being an alternative to FIGS. 1 to 9, of a latch element of the switching unit on the handle housing, in a schematic representation.

FIG. 10 is a detail view showing, arranged on a handle housing 32b of an alternative power tool 10b, realized as a portable power tool 10b, a release element 18b of a switching unit 14b of the portable power tool 10b, when the release element 18b is in an unactuated state. The power tool 10b has a structure that is at least substantially similar to that of the power tool 10a from FIG. 1. Reference may therefore be made, at least substantially, to the description of FIG. 1 in respect of a description, or features, of the power tool 10b of the further exemplary embodiment. The power tool 10b comprises at least one switching unit 14b, which has at least one movably mounted latch element 16b, and has at least one release element 18b for unlocking a movement inhibitor of the latch element 16b. The release element 18b comprises at least one actuating region 20b of the release element 18b that is arranged, at least partially, laterally next to an operating surface 22b of the latch element 16b. The release element 18b is arranged on the handle housing 32b, in a region of an end of the handle housing 32b that faces toward a connecting region 54b of the handle housing 32b. Moreover, the release element 18b is arranged entirely outside of a stem-type grip region 52b of the handle housing 32b.

The release element 18b is mounted so as to be pivotable about at least one release movement axis 24b. The release movement axis 24b is thus realized as a release pivot axis. The release element 18b has, at least, the release movement axis 24b, which runs in a plane extending at least substantially perpendicularly in relation to a movement axis 26b of the latch element 16b. The latch element 16b in this case is mounted so as to be pivotable about a movement axis 26b, realized as a pivot axis 48b, of the latch element 16b. The movement axis 26b, realized as a pivot axis 48b, runs at least substantially perpendicularly in relation to a joint plane of the handle housing 32b, in which two handle housing shell elements 76b, 78b of the handle housing 32b are joined to each other. The release movement axis 24b thus runs at least substantially parallelwise in relation to the joint plane of the handle housing 32b. Moreover, the release movement axis 24b runs at least substantially transversely in relation to the movement axis 26b, realized as a pivot axis 48b, of the latch element 16b. The latch element 16b in this case is pivotally mounted at an end of the latch element 16b that faces toward the connecting region 54b, by means of a bearing unit 90b of the portable power tool 10b. It is also conceivable, however, for the latch element 16b to be pivotally mounted at an end of the latch element 16b that faces away from the connecting region 54b, by means of the bearing unit 90b, or to be translationally mounted, by means of the bearing unit 90b. The latch element 16b is arranged on a side of the handle housing 32b that faces toward an inner surface of a hand of an operator (not represented in greater detail here) when the handle housing 32b is gripped for proper handling of the portable power tool 10b. In each operating state, the latch element 16b is arranged on a side of the handle housing 32b that differs from a further side of the handle housing 32b, which faces toward an output side of an output housing (not represented in greater detail here), and extending out from which there is a spindle for driving, or coupling, a working tool (not represented in greater detail here).

Furthermore, the switching unit 14b has at least one further release element 28b. The further release element 28b is likewise arranged on the handle housing 32b, in the region of the end of the handle housing 32b that faces toward the connecting region 54b. Moreover, the further release element 28b is likewise arranged entirely outside of the stem-type grip region 52b on the handle housing 32b. The further release element 28b is arranged in a mirror-symmetrical manner in relation to the release element 18b (FIG. 4). The further release element 28b thus has at least one actuating region 34b, which, in respect of a plane extending at least substantially perpendicularly in relation to the movement axis 26b of the latch element 16b, is arranged, at least partially, laterally next to the operating surface 22b of the latch element 16b, in a mirror-symmetrical manner in relation to the actuating region 20b of the release element 18b. In this case, the release element 18b and the further release element 28b are motionally coupled to each other by means of a movement dependence unit 30b of the portable power tool 10b.

Figure 11:
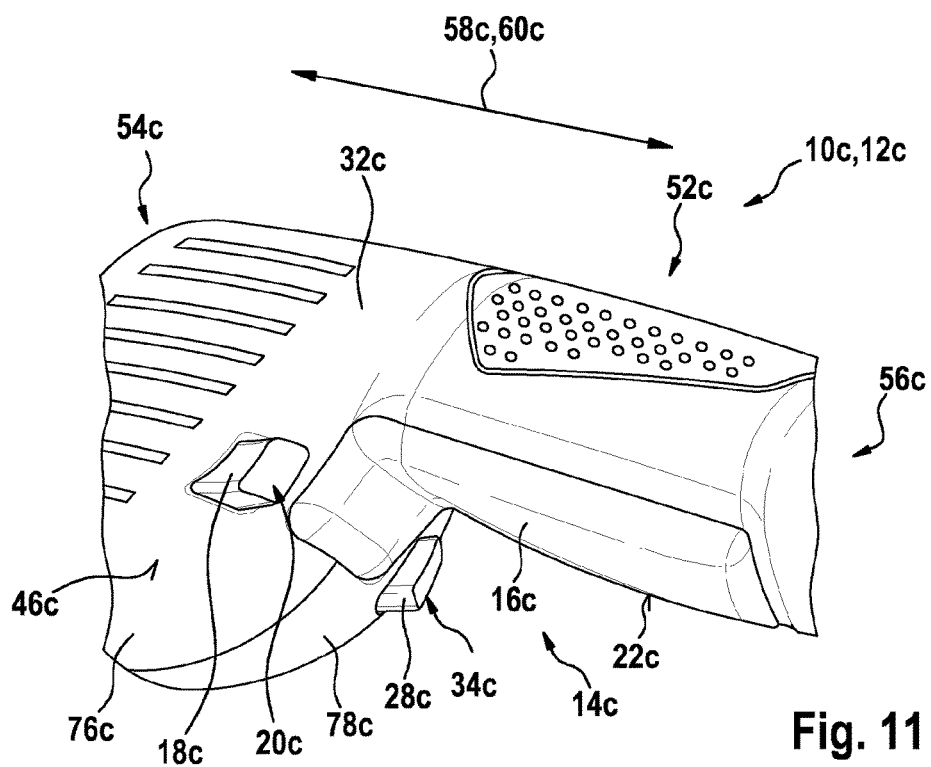
FIG. 11 shows a detail view of a release element, arranged on a handle housing of a further, alternative power tool according to the disclosure, of a switching unit of the further, alternative power tool according to the disclosure, in an unactuated state, in a schematic representation.

FIG. 11 is a detail view showing, arranged on a handle housing 32c of an alternative power tool 10c, realized as a portable power tool 10c, a release element 18c of a switching unit 14c of the portable power tool 10c, when the release element 18c is in an unactuated state. The power tool 10c has a structure that is at least substantially similar to that of the power tool 10a from FIG. 1. Reference may therefore be made, at least substantially, to the description of FIG. 1 in respect of a description, or features, of the power tool 10c of the further exemplary embodiment. The power tool 10c comprises at least one switching unit 14c, which has at least one movably mounted latch element 16c, and has at least one release element 18c for unlocking a movement inhibitor of the latch element 16c. The release element 18c comprises at least one actuating region 20c of the release element 18c that is arranged, at least partially, laterally next to an operating surface 22c of the latch element 16c. The release element 18c is arranged on the handle housing 32c, in a region of an end of the handle housing 32c that faces toward a connecting region 54c of the handle housing 32c. Moreover, the release element 18c is arranged entirely outside of a stem-type grip region 52c of the handle housing 32c.

Figure 12:
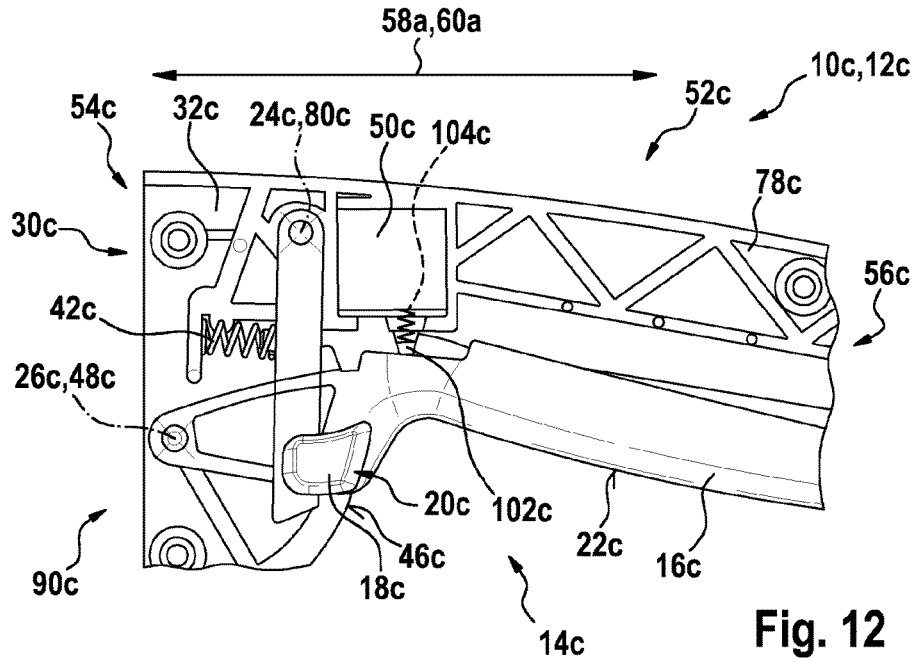
FIG. 12 shows a further detail view of the release element, in an actuated state, in a schematic representation.

The release element 18c is mounted so as to be pivotable about at least one release movement axis 24c. The release movement axis 24c is thus realized as a release pivot axis. The release element 18c thus has, at least, the release movement axis 24c, which runs at least substantially parallelwise in relation to a movement axis 26c, realized as a pivot axis 48c, of the latch element 16c (FIG. 12). The movement axis 26c of the latch element 16c runs at least substantially perpendicularly in relation to a joint plane of the handle housing 32b, in which two handle housing shell elements 76c, 78c can be joined. In this case, the latch element 16c is pivotally mounted at an end of the latch element 16c that faces toward a connecting region 54c of the handle housing 32c, by means of a bearing unit 90c of the portable power tool 10c. It is also conceivable, however, for the latch element 16c to be pivotally mounted at an end of the latch element 16c that faces away from the connecting region 54c, by means of the bearing unit 90c, or to be translationally mounted, by means of the bearing unit 90c.

Furthermore, the switching unit 14c has at least one further release element 28c. The further release element 28c is likewise arranged on the handle housing 32c, in the region of the end of the handle housing 32c that faces toward the connecting region 54c. Moreover, the further release element 28c is likewise arranged entirely outside of the stem-type grip region 52c on the handle housing 32c. The further release element 28c is arranged in a mirror-symmetrical manner in relation to the release element 18c. The further release element 28c thus has at least one actuating region 34c, which, in relation to a plane extending at least substantially perpendicularly in relation to the movement axis 26c of the latch element 16c, is arranged, at least partially, laterally next to the operating surface 22c of the latch element 16c, in a mirror-symmetrical manner in relation to the actuating region 20c of the release element 18c. In this case, the release element 18c and the further release element 28c are motionally coupled to each other by means of a movement dependence unit 30c of the portable power tool 10c. The movement dependence unit 30c in this case couples the release element 18c and the further release element 28c rigidly to each other. Upon an actuation of the release element 18c or of the further release element 28c, the release element 18c and the further release element 28c are thus always moved jointly in the same direction. In this case, the release element 18c and the further release element 28c are moved in a direction toward the handle housing 32c, as a result of an actuation of the release element 18c or of the further release element 28c in a direction toward the handle housing 32c, by means of the movement dependence unit 30c.

Figure 13:
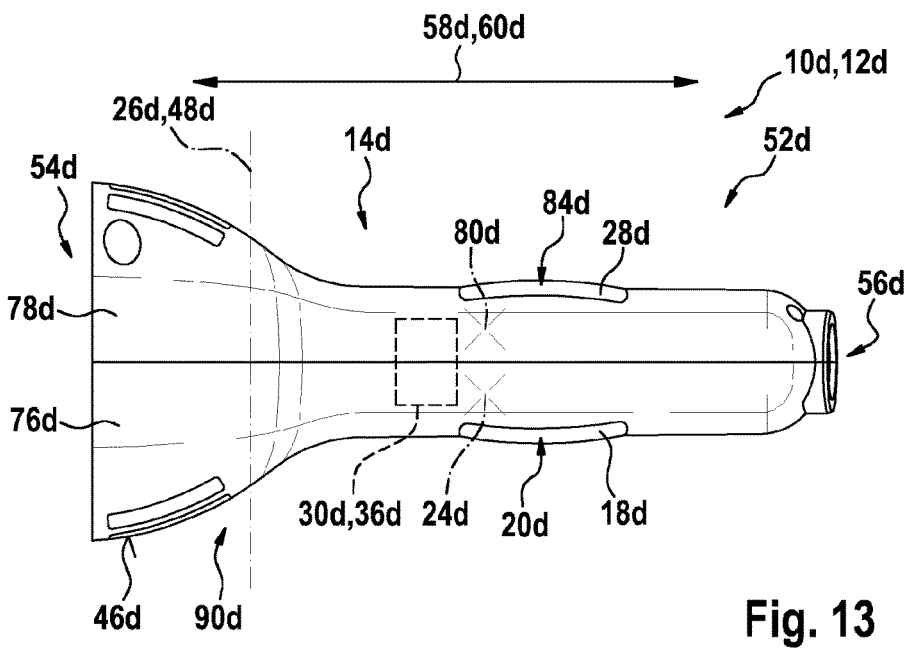
FIG. 13 shows a detail view of an arrangement, being an alternative to FIGS. 1 to 12, of a release element of a switching unit of a further, alternative power tool according to the disclosure, on a handle housing of the further, alternative power tool according to the disclosure, in a schematic representation.

FIG. 13 is a detail view showing, arranged on a handle housing 32d of an alternative power tool 10d, realized as a portable power tool 10d, a release element 18d of a switching unit 14d of the portable power tool 10d, when the release element 18d is in an unactuated state. The power tool 10d has a structure that is at least substantially similar to that of the power tool 10a from FIG. 1. Reference may therefore be made, at least substantially, to the description of FIG. 1 in respect of a description, or features, of the power tool 10d of the further exemplary embodiment. The power tool 10d comprises at least one switching unit 14d, which has at least one movably mounted latch element (not represented in greater detail here), and has at least one release element 18d for unlocking a movement inhibitor of the latch element 16d. The release element 18d comprises at least one actuating region 20d of the release element 18d that is arranged, at least partially, laterally next to an operating surface (not represented in greater detail here) of the latch element. The release element 18d is arranged entirely on a stem-type grip region 52d of the handle housing 32d.

The release element 18d is mounted so as to be pivotable about a release movement axis 24d of the release element 18d. The release element 18d has, at least, the release movement axis 24d, which runs in a plane extending at least substantially perpendicularly in relation to a movement axis 26d of the latch element 16d. As an alternative to the pivotable mounting, however, it is also conceivable for the release element 18d to be mounted so as to be translationally movable along a release movement axis 24d running at least substantially parallelwise in relation to the movement axis 26d of the latch element. The latch element 16d in this case is mounted so as to be pivotable about a movement axis 26d, realized as a pivot axis 48d, of the latch element. The movement axis 26d, realized as a pivot axis 48d, runs at least substantially perpendicularly in relation to a joint plane of the handle housing 32d, in which two handle housing shell elements 76d, 78d of the handle housing 32d are joined to each other. Furthermore, the switching unit 14d has at least one further release element 28d. The further release element 28d is likewise arranged entirely in the stem-type grip region 52d on the handle housing 32d. The further release element 28d arranged on the handle housing 32d, in a mirror-symmetrical manner in relation to the release element 18d. In this case, the release element 18d and the further release element 28d are motionally coupled to each other by means of a movement dependence unit 30d of the portable power tool 10d.

Figure 14:
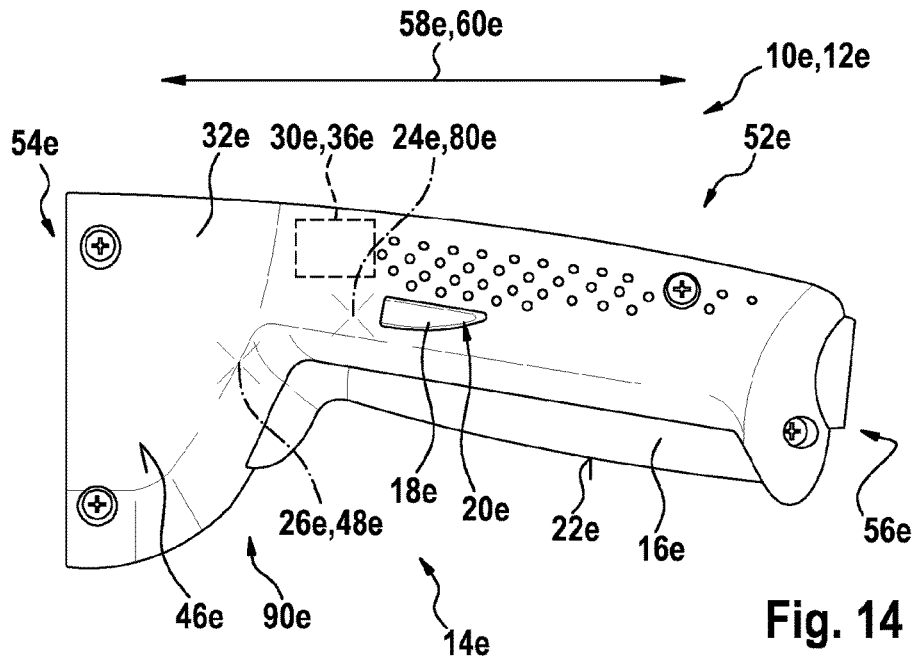
FIG. 14 shows a detail view of an arrangement, being an alternative to FIGS. 1 to 13, of a release element of a switching unit of a further, alternative power tool according to the disclosure, on a handle housing of the further, alternative power tool according to the disclosure, in a schematic representation.

FIG. 14 is a detail view showing, arranged on a handle housing 32e of an alternative power tool 10e, realized as a portable power tool 10e, a release element 18e of a switching unit 14e of the portable power tool 10e, when the release element 18e is in an unactuated state. The power tool 10e has a structure that is at least substantially similar to that of the power tool 10a from FIG. 1. Reference may therefore be made, at least substantially, to the description of FIG. 1 in respect of a description, or features, of the power tool 10e of the further exemplary embodiment. The power tool 10e comprises at least one switching unit 14e, which has at least one movably mounted latch element 16e, and has at least one release element 18e for unlocking a movement inhibitor of the latch element 16e. The release element 18e comprises at least one actuating region 20e of the release element 18e that is arranged, at least partially, laterally next to an operating surface 22e of the latch element 16e. The release element 18e is arranged entirely in a stem-type grip region 52e of the handle housing 32e. The release element 18e in this case has at least one release movement axis 24e, which runs at least substantially parallelwise in relation to a movement axis 26e, realized as a pivot axis 48e, of the latch element 16e. The release element 18e is mounted so as to be pivotable about the release movement axis 24e. It is also conceivable, however, for the release element 18e to be mounted so as to be translational along a release movement axis 24e that runs at least substantially transversely in relation to the movement axis 26e of the latch element 16e. Furthermore, the switching unit 14e has at least one further release element (not represented in greater detail here). The further release element is likewise arranged entirely in the stem-type grip region 52e on the handle housing 32e. The further release element is arranged on the handle housing 32e, in a mirror-symmetrical manner in relation to the release element 18e. In this case, the release element 18e and the further release element are motionally coupled to each other by means of a movement dependence unit 30e of the portable power tool 10e.

Figure 15:
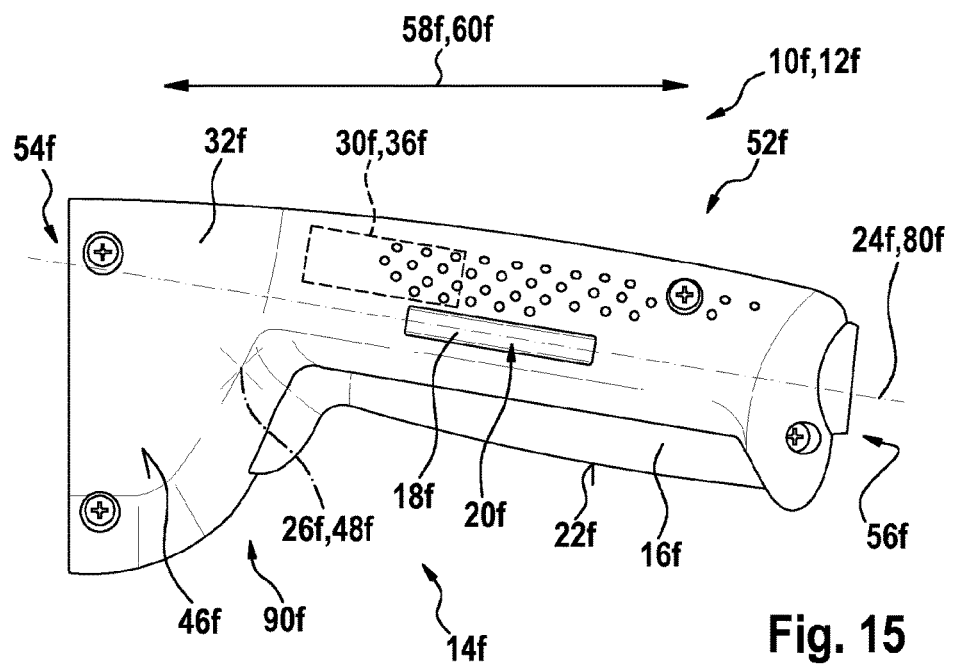
FIG. 15 shows a detail view of an arrangement, being an alternative to FIGS. 1 to 14, of a release element of a switching unit of a further, alternative power tool according to the disclosure, on a handle housing of the further, alternative power tool according to the disclosure, in a schematic representation.

FIG. 15 is a detail view showing, arranged on a handle housing 32f of an alternative power tool 10f, realized as a portable power tool 10f, a release element 18f of a switching unit 14f of the portable power tool 10f, when the release element 18f is in an unactuated state. The power tool 10f has a structure that is at least substantially similar to that of the power tool 10a from FIG. 1. Reference may therefore be made, at least substantially, to the description of FIG. 1 in respect of a description, or features, of the power tool 10f of the further exemplary embodiment. The power tool 10f comprises at least one switching unit 14f, which has at least one movably mounted latch element 16f, and has at least one release element 18f for unlocking a movement inhibitor of the latch element 16f. The release element 18f comprises at least one actuating region 20f of the release element 18f that is arranged, at least partially, laterally next to an operating surface 22f of the latch element 16f. The release element 18f is arranged entirely in a stem-type grip region 52f of the handle housing 32f. The release element 18f in this case has at least one release movement axis 24f, which runs in a joint plane of the handle housing 32f and at least substantially transversely in relation to a movement axis 26f, realized as a pivot axis 48f, of the latch element 16f. The release element 18f is mounted so as to be translationally movable along the release movement axis 24f. Furthermore, the switching unit 14f has at least one further release element (not represented in greater detail here). The further release element is likewise arranged entirely in the stem-type grip region 52f of the handle housing 32f. The further release element is arranged on the handle housing 32f, in a mirror-symmetrical manner in relation to the release element 18f. In this case, the release element 18f and the further release element are motionally coupled to each other by means of a movement dependence unit 30f of the portable power tool 10f.

Figure 16:
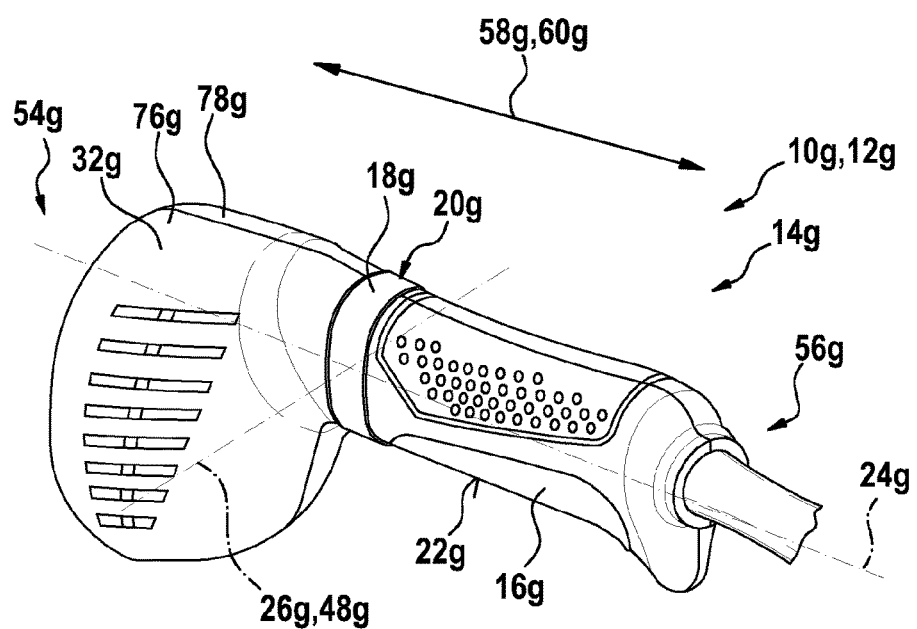
FIG. 16 shows a detail view of an arrangement, being an alternative to FIGS. 1 to 15, of a release element of a switching unit of a further, alternative power tool according to the disclosure, on a handle housing of the further, alternative power tool according to the disclosure, in a schematic representation.

FIG. 16 is a detail view showing, arranged on a handle housing 32g of an alternative power tool 10g, realized as a portable power tool 10g, a release element 18g of a switching unit 14g of the portable power tool 10g, when the release element 18g is in an unactuated state. The power tool 10g has a structure that is at least substantially similar to that of the power tool 10a from FIG. 1. Reference may therefore be made, at least substantially, to the description of FIG. 1 in respect of a description, or features, of the power tool 10g of the further exemplary embodiment. The power tool 10g comprises at least one switching unit 14g, which has at least one movably mounted latch element 16g, and has at least one release element 18g for unlocking a movement inhibitor of the latch element 16g. The release element 18g comprises at least one actuating region 20g of the release element 18g that is arranged, at least partially, laterally next to an operating surface 22g of the latch element 16g. The release element 18g is arranged entirely in a stem-type grip region 52g of the handle housing 32g. The release element 18g in this case has at least one release movement axis 24g, which runs at least substantially transversely in relation to a movement axis 26g, realized as a pivot axis 48g, of the latch element 16g. The release movement axis 24g extends in a joint plane of the handle housing 32g, which runs at least substantially perpendicularly in relation to the movement axis 26g of the latch element 16g. The release element 18g is mounted on the handle housing 32g so as to be rotatable about the release movement axis 24g.

The invention claimed is:

1. A power tool, comprising:
at least one switching unit including:
at least one movably mounted latch element having a transverse extent defining a first distance, and a longitudinal extent running substantially perpendicular to the transverse extent and defining a second distance that is greater than the first distance;
at least one release element having at least one actuating region and being configured to move between a locking position and an unlocking position;
a movement inhibitor configured to inhibit movement of the at least one movably mounted latch element when the at least one release element is in the locking position, and configured to permit movement of the at least one movably mounted latch element when the at least one release element is in the unlocking position; and
at least one spring element configured to apply a spring force to the at least one release element to bias the at least one release element towards the locking position,
wherein the at least one actuating region of the at least one release element is arranged, at least partially, at a distance away from an operating surface of the at least one movably mounted latch element in a direction parallel to the longitudinal extent of the at least one movably mounted latch element,
wherein the at least one release element is mounted so as to be at least one of pivotable and rotatable about at least one release movement axis that runs parallel in relation to a movement axis of the at least one movably mounted latch element, and
wherein the at least one switching unit has at least one further release element, the power tool further comprising:
at least one movement dependence unit that motionally couples the at least one release element and the at least one further release element to each other, at least when in a mounted state.

2. The power tool as claimed in claim 1, further comprising at least one handle housing, wherein, as a result of an actuation of the at least one release element or of the at least one further release element in a direction toward the at least one handle housing, the at least one release element and the at least one further release element are moved by the at least one movement dependence unit in a direction toward the at least one handle housing.

3. The power tool as claimed in claim 1, wherein the at least one release element and the at least one further release element are mounted so as to be movable relative to each other.

4. The power tool as claimed in claim 3, further comprising at least one movement dependence unit configured to move the at least one release element and the at least one further release element in the same direction as a result of an actuation of the at least one release element or of the at least one further release element.

5. The power tool as claimed in claim 4, wherein the at least one movement dependence unit rigidly couples the at least one release element to the at least one further release element.

6. The power tool as claimed in claim 1, wherein the at least one release element has at least one unlocking receiving recess configured to receive an inhibitor element of the at least one switching unit when the at least one release element is in the unlocking position as a result of an actuation of the at least one movably mounted latch element.

7. The power tool as claimed in claim 1, further comprising at least one handle housing, wherein the at least one actuating region of the at least one release element, after an actuation, is at least substantially flush with an outer surface of the at least one handle housing.

8. The power tool as claimed in claim 1, further comprising at least one handle housing, wherein the at least one actuating region of the at least one release element and at least one further actuating region of at least one further release element of the at least one switching unit, after an actuation, are at least substantially flush with an outer surface of the at least one handle housing.

9. The power tool as claimed in claim 1, wherein:
the at least one movably mounted latch element is mounted so as to be pivotable about the movement axis of the least one movably mounted latch element; and
the movement axis of the at least one movably mounted latch element is configured as a pivot axis.

10. The power tool as claimed in claim 1, wherein the at least one release element is configured to move into the unlocking position when an external force applied to the actuating region is greater than the spring force, and is configured to move into the locking position when the external force applied to the actuating region is less than or equal to the spring force and when the at least one movably mounted latch element is released.

11. A power tool, comprising:
at least one switching unit including:
at least one movably mounted latch element having a transverse extent defining a first distance, and a longitudinal extent running substantially perpendicular to the transverse extent and defining a second distance that is greater than the first distance;
at least one release element having at least one actuating region and being configured to move between a locking position and an unlocking position;
a movement inhibitor configured to inhibit movement of the at least one movably mounted latch element when the at least one release element is in the locking position, and configured to permit movement of the at least one movably mounted latch element when the at least one release element is in the unlocking position; and
at least one spring element configured to apply a spring force to the at least one release element to bias the at least one release element towards the locking position,
wherein the at least one actuating region of the at least one release element is arranged, at least partially, at a distance away from an operating surface of the at least one movably mounted latch element in a direction parallel to the longitudinal extent of the at least one movably mounted latch element,
wherein the at least one release element is mounted so as to be at least one of pivotable and rotatable about at least one release movement axis that runs parallel in relation to a movement axis of the at least one movably mounted latch element,
wherein the at least one switching unit has at least one further release element, and
wherein the at least one further release element is arranged in a mirror-symmetrical manner in relation to the at least one release element.

12. A power tool, comprising:
at least one switching unit including:
at least one movably mounted latch element having a transverse extent defining a first distance, and a longitudinal extent running substantially perpendicular to the transverse extent and defining a second distance that is greater than the first distance;
at least one release element having at least one actuating region and being configured to move between a locking position and an unlocking position;
a movement inhibitor configured to inhibit movement of the at least one movably mounted latch element when the at least one release element is in the locking position, and configured to permit movement of the at least one movably mounted latch element when the at least one release element is in the unlocking position; and
at least one spring element configured to apply a spring force to the at least one release element to bias the at least one release element towards the locking position,
wherein the at least one actuating region of the at least one release element is arranged, at least partially, at a distance away from an operating surface of the at least one movably mounted latch element in a direction parallel to the longitudinal extent of the at least one movably mounted latch element,
wherein the at least one release element is mounted so as to be at least one of pivotable and rotatable about at least one release movement axis that runs parallel in relation to a movement axis of the at least one movably mounted latch element,
wherein the at least one switching unit has at least one further release element, and
wherein the at least one further release element has at least one further actuating region, which, in respect of a plane extending substantially perpendicularly in relation to the movement axis of the at least one movably mounted latch element, is arranged, at least partially, at a distance away from the operating surface of the at least one movably mounted latch element in a direction parallel to the longitudinal extent of the at least one movably mounted latch element, in a mirror-symmetrical manner in relation to the at least one actuating region of the at least one release element.

* * * * *